US007008984B2

(12) United States Patent  
Schneider

(10) Patent No.: US 7,008,984 B2
(45) Date of Patent: Mar. 7, 2006

(54) FURAN POLYMER IMPREGNATED WOOD

(75) Inventor: Marc H. Schneider, Fredericton (CA)

(73) Assignee: Wood Polymer Technologies ASA, Oslo (NO)

( * ) Notice: Subject to any disclaimer, the term of this patent is extended or adjusted under 35 U.S.C. 154(b) by 0 days.

(21) Appl. No.: 10/060,302

(22) Filed: Feb. 1, 2002

(65) Prior Publication Data

US 2002/0192400 A1    Dec. 19, 2002

Related U.S. Application Data

(60) Provisional application No. 60/272,049, filed on Mar. 1, 2001.

(30) Foreign Application Priority Data

Feb. 1, 2001  (NO) ................................ 2001 0558

(51) Int. Cl.
  *B27K 3/15*   (2006.01)
  *B27K 3/34*   (2006.01)
(52) U.S. Cl. .......................... 524/13; 524/47; 427/393; 427/440
(58) Field of Classification Search .................. 524/47, 524/13; 427/393, 440
  See application file for complete search history.

(56) References Cited

U.S. PATENT DOCUMENTS 2,909,450 A    10/1959   Goldstein
3,622,380 A    11/1971   Williams
3,943,084 A    3/1976    Hess
4,015,995 A    4/1977    Hess
4,678,715 A    7/1987    Giebeler et al.
5,804,591 A *  9/1998    Valcke et al. ................ 514/383
6,124,028 A    9/2000    Nagle et al.
6,451,153 B1   9/2002    Symons
6,670,029 B1   12/2003   Norton et al.
2003/0148965 A1 * 8/2003  Hofer et al. ................... 514/28
2004/0028933 A1  2/2004   Schneider .................... 428/534

FOREIGN PATENT DOCUMENTS

EP      1069173 A1 *   1/2001

OTHER PUBLICATIONS

Westin, M. et al., "New Chemicals for Wood Preservation and New Ways of Chemical Modification" CAPLUS Accession No. 1966:412339 from Book of Abstracts, 212$^{th}$ ACS National Meeting, Orlando, FL, Aug. 25-29 (1996).

* cited by examiner

Primary Examiner—James J. Seidleck
Assistant Examiner—Irina S. Zemel
(74) Attorney, Agent, or Firm—Finnegan, Henderson, Farabow, Garrett & Dunner, L.L.P.

(57) ABSTRACT

A furan polymer impregnated wood which comprises wood impregnated with a polymerizable furfural alcohol monomer solution containing at least water, stabilizers, and furfuryl alcohol, and at least one further compound selected from the group consisting of anhydrides, acids and combinations thereof is described.

A method for preparing a furan polymer impregnated wood and uses thereof is also described.

4 Claims, No Drawings

FURAN POLYMER IMPREGNATED WOOD

CROSS REFERENCE TO RELATED APPLICATIONS

This application claims the right to priority based on Norwegian Application No. 2001 0558, filed Feb. 1, 2001 and claims the benefit of U.S. Provisional Application No. 60/272,049, filed Mar. 1, 2001.

BACKGROUND OF THE INVENTION

The invention described herein relates to a furan polymer impregnated wood which is uniform in colour and density throughout the treated zone. In order to obtain the polymer impregnated wood, a parent wood has been impregnated with a polymerizable furfural alcohol monomer solution containing at least water, stabilizers, and furfuryl alcohol, and at least one further compound. The invention also relates to a method for preparing a furan polymer impregnated wood and uses thereof.

Currently, wood is chemically preserved (protected from biodeterioration) mainly by using toxic preservatives. Most of these preservatives also have toxicity to other organisms in the environment, including humans. Even if they are well-fixed in wood, their presence presents a problem for end-of-use. Two approaches which are designed to use more environmentally-friendly chemicals are i) use of water-soluble salts which have low toxicity and ii) use of non-toxic chemicals which react with and alter the wood cell walls, making them less susceptible to biodeterioration.

Approach i) has the drawback that such salts usually leach out of wood in contact with water, limiting their usefulness. Boron and copper compounds have been used in this way. They have the advantage that some such salts act as fire retardants as well as reducing biodeterioration.

An example of approach ii) is the subject of a previous invention disclosed by Schneider (NO-A-20005137) based on furfuryl alcohol (FA) treating formulations. This previous invention used an undiluted treating solution, and treated the wood to high levels of retention. For woods with specific gravity near 0.30 (such as pine), the retention of chemical may approach 200% of the weight of the dry wood. For denser woods (about 0.60 specific gravity, such as maple and beech) retention can be in the 100% range. This level of retention has been shown to give excellent protection from biodeterioration, high dimensional stability in varying moisture conditions and an increase in most mechanical properties, particularly hardness. The main disadvantage with this treatment is the large amount of chemical used and the resulting cost.

Furfuryl alcohol is highly water soluble and therefore easily forms a uniform solution with water which can be used to impregnate wood. Therefore, FA impregnating solutions containing different amounts of water are easily made. However, there are things which must be overcome before a useful wood polymer composite can be made. First, after being impregnated into wood, the solution must be polymerized to be useful. Second, the polymerization must occur in wet or dry wood. Third, the polymerization must occur at fairly low temperatures.

Chemical initiators therefore must be added to the FA to make it polymerize in the desired temperature range and in wet or dry wood. How to initiate FA and make it polymerize in the desired temperature range is known from NO-A-20005137. However, the initiated FA from that technology does not mix well with water. Combing them causes the mixtures to separate into two components which cannot be uniformly impregnated into wood.

One object of the invention is to provide a furan polymer impregnated wood by altering the wood cell wall with the same chemical monomer as that disclosed in NO-A-20005137 but using smaller amounts of chemical.

Another object of the invention is to provide a uniform distribution of the chemicals in the furan polymer impregnated wood which causes uniform colour and density throughout the treated zone, by using water as an environmentally-friendly and production-friendly diluent which would permit uniform but low retention of active chemical in the treated zone of the wood.

Still another object of the invention is to provide a furan polymer impregnated wood having improved properties as regards dimensional stability, rot resistance, i.a.

According to the present invention, the foregoing and other objects are attained by a product, method and uses thereof as disclosed herein.

SUMMARY OF THE INVENTION

In one embodiment of this invention, there is provided a furan polymer impregnated wood, characterized by wood impregnated with a polymerizable furfural alcohol monomer solution containing at least water, stabilizers, furfuryl alcohol, and one further compound selected from maleic anhydride, phthalic anhydride, maleic acid, malic acid, phthalic acid, and combinations thereof.

In another embodiment of this invention, there is provided a method for preparing a furan polymer impregnated wood, characterized in that the wood is impregnated by one impregnation step with polymerizable furfural alcohol monomer solution containing at least water, stabilizers, and furfuryl alcohol, and at least one further compound selected from the group consisting of anhydrides, acids and combinations thereof, followed by a curing step.

In still another embodiment of the invention, there is provided use of a furan polymer impregnated wood.

DETAILED DESCRIPTION OF THE INVENTION

Two keys to the invention are 1) the use of one or more chemicals acting as new initiators and 2) the use of stabilizers which allows the initiated monomer to be water soluble. The initiators have similar affinity for wood as furfuryl alcohol and therefore enter the wood and remain in solution as deeply as it penetrates, Wherever the solution penetrates, it is polymerizable. The initiators are selected from any anhydride-containing compound as well as acids selected from the group of maleic acid, malic acid, phthalic acid, and stearic acid. However, preferably a compound selected from maleic anhydride, malic anhydride, phthalic anhydride and combinations thereof is used. More preferably, maleic anhydride or phthalic anhydride or a combination thereof is used, most preferably maleic anhydride or phthalic anhydride. The stabilizers are borax and lignosulfonic acids. To make a treating solution, at least one of the initiators, preferably one of these initiators only, and both of the stabilizers are dissolved in water. Furfuryl alcohol is then added, forming a solution which has several months useful life at room temperature.

If limited surface impregnation or end-grain penetration is needed, brushing, rolling, spraying or soaking can be used.

For easily impregnable woods, when deep penetration is needed, vacuum only may be used. For deep and uniform penetration, there are three options: a) pressure alone (1 to 10 bar), b) vacuum followed by pressure (full cell process), c) atmospheric or low (1 bar) pressure followed by pressure and then final vacuum (empty-cell process).

For difficult-to-penetrate woods like spruce, an oscillating pressure method may be used.

Times of all of these processes depend upon many factors, including capability of equipment, size of wood, species of wood and penetration desired.

Impregnation method generally used (full cell process) in accordance with the present invention will depend on treatment loading desired, such as follows:

i) loading vessel with wood and securing the load so it will not float (if using air pressure, i.e., not a fluid pressure pump system),
ii) closing door and drawing an appropriate partial vacuum,
iii) filling the vessel with the treating solution,
iv) pressurizing the submerged wood to a pressure in the range of 7 to 10 bar (100–150 psi) depending on wood species or other factors. Pressurizing for 30 to 60 min.,
v) after sufficient time under pressure, reducing pressure to 2 or 3 bar, and expelling the treating fluid with remaining pressure,
vi) drawing a full vacuum in the treating vessel and holding for about 15 min.,
vii) releasing vacuum and pressurizing to 2 bar,
viii) expelling the treating fluid (that was removed from cell lumens in step iv),
ix) releasing all pressure, opening door and removing treated wood to curing area.

Wood moisture content must be below fiber saturation point (about 30% MC) in the zone to be treated. The further below, the more chemical which can be impregnated. If a specific target amount of chemical is required, the moisture content of the wood and the amount of solution impregnated must be taken into account and the concentration of the treating chemical adjusted accordingly.

The treating solution is mixed and may contain, based on the weight of a given amount of water: borax (3%), maleic anhydride (2,3%), sodium salt of lignosulfonic acid (5,5%), and furfuryl alcohol (30,0%).

The mixing operation is started by heating the water to approximately 60° C. to facilitate the addition of borax, maleic anhydride and lignosulfonic acid components. When these solid additives are fully dissolved in the water, the solution is cooled to 20–25° C. and then the furfuryl alcohol is blended in with stirring, and is stored at a temperature of 15–20° C.

The curing can take place at a range of temperatures, starting at from about 25° C. to about 140° C. The lower temperatures (below about 40° C.) require a long time to cure (days or weeks). From about 70° C. to about 100° C. the curing time is hours. Above 100° C. makes times even shorter but conditions are difficult because rapid drying can occur and break the wood.

In accordance with the present invention steam or hot, humid air curing in the temperature range of about 70–100° C. works well at a fixed temperature within the range. Also, temperature can be increased as curing and drying proceeds. Essentially, this is conventional temperature kiln drying operation. Curing and drying in hot oil also works well at temperatures from 70 to 120° C., either a fixed temperature within the range or by increasing temperature within the range as curing and drying proceeds. The furfuryl alcohol will cure readily in this temperature range with the furfuryl alcohol/initiator ratio used. Material 10 to 20 mm thick will cure in just two or three hours, but drying to final moisture content takes longer.

The starting material is a woody material, usually lumber, which includes plank (thick lumber), but can also be wood composites such as oriented strand board and particle board. Woody materials of any dimensions can be utilized.

The length of the woody materials is important since the treating solution travels very fast along the length but very slow across the cross-section. With permeable woods like beech and birch, the uniformity of treatment is determined by how well the treating solution remains uniform as it travels along the length. When impregnation is complete, the permeable woody material formed by this method has uniform properties throughout. Colour, resistance to moisture and deterioration and mechanical properties are consistent throughout. The properties and colour of individual pieces of lumber treated this way depend upon the loading of polymer achieved, Different species of wood, and even different boards of the same species, may impregnate differently. However, resistance to moisture and deterioration are little affected by loading.

Woody material, including cheap types and scrap material, can be used to produce noble wood products such as imitation teak, mahogany, and others, and also provide them with novel properties like water resistance and simpler and reduced maintenance requirements.

The following examples will further illustrate the invention.

Attempts were made to change the initiator types and amounts to obtain a combination that would result in a water-soluble, curable mixture with a useful shelf life. After many trials, two things became apparent:

1. Maleic anhydride (MA) was the best polymerization initiator. It is also a desirable component because it is thought to act as a bonding agent to wood.
2. Stabilizers were needed to keep the mixture uniform. Otherwise, it separated into two components and one settled to the bottom.
3. The pH must be near neutral for a uniform, stable mixture to be formed and maintained.
4. The pH must be on the acid side for curing to occur.

Surfactants and compatibilizers were tried as stabilizers. Borax (sodium tetraborate decahydrate) made homogeneous mixtures that penetrated wood well, and therefore became one of the stabilizers of choice. In some mixtures, stronger buffering to control pH using other compounds, such as sodium hydroxide, helped in maintaining a uniform mixture. Such compounds must maintain their buffering capacity until after the wood is impregnated. Then it is necessary for the pH to drop to facilitate curing.

The effects of varying MA initiator and borax stabilizer in the mixture on some physical properties of wood treated with them are given in Table 1.

The concentration study showed that the solution introduced into wood at concentrations between about 8% and 39% progressively increase wood dimensions at impregnation, polymer loading and antiswell efficiency. The values for the concentration chosen for further work (31%) and the highest concentration water solution tested (39%) are compared to values for undiluted, initiated FA in Table 3.

TABLE 1

Monomer mixture concentrations and effects on wood properties.

| | Treating formulation | | | | Cured material | | | | | | | |
|---|---|---|---|---|---|---|---|---|---|---|---|---|
| | % added based on solution | | | | % swell | | % wt increase | | % water swell | | % ASE | |
| | FA | MA | Borax | Total | Pine | Beech | Pine | Beech | Pine | Beech | Pine | Beech |
| Water | 0 | 0 | 0 | 0 | 1.7 | 2.2 | −0.8 | −0.4 | 9.8 | 17 | 0 | 0 |
| | 4.8 | 1.9 | 1.9 | 8.6 | *2.4* | 2.9 | NA | NA | *8.6* | 16 | 12 | *6* |
| | 9.1 | 2.7 | 2.7 | 14.5 | 3.0 | 3.6 | 8.2 | 6.3 | 7.3 | 15 | 26 | 12 |
| | 16.7 | 3.2 | 3.2 | 23.1 | 4.2 | 6.0 | 14.0 | 10.2 | 6.8 | 14 | 31 | 18 |
| | 23.1 | 3.7 | 3.7 | 30.5 | 5.7 | 7.0 | 20.5 | 14.6 | 6.3 | 12 | 36 | 29 |
| | 23.1 | 5.1 | 5.1 | 33.3 | 5.7 | 7.0 | NA | NA | NA | NA | 36 | *29* |
| | 28.6 | 4.1 | 4.1 | 36.8 | 6.9 | 7.1 | 26.9 | 17.6 | 4.6 | 13 | 53 | *24* |
| | 33.3 | 4.5 | 4.5 | 42.3 | 5.5 | 7.3 | 30.9 | 16.1 | 5.5 | 11 | 44 | 35 |
| initiated FA | 93.9 | 6.5 | 0 | NA | 8.1 | 11.5 | 57.4 | 36.3 | 4.1 | 7 | 58 | 59 |

Note:
Italic values are interpolated or calculated from interpolated values. Percent swell is the remaining swelling after curing. Percent weight increase is after curing. Water swell is maximum swelling in liquid water at 23EC and the ASE is anti-swell efficiency or percent retardation of swelling of the cured material in liquid water (based on the water swelling data).

To be useful, the mixture must impregnate and then cure throughout the wood, giving a uniform product. The monomer mixture containing 23.1% FA, and 5.1% each of MA and borax was selected for a uniformity-of-treating trial. The results are given in Table 2.

TABLE 2

Results treating samples for uniformity.

| Scots pine samples | | | | | | Beech samples | | | | |
|---|---|---|---|---|---|---|---|---|---|---|
| Sample | % soln uptake | % poly uptake | Wt soln | Wt poly | % solids | Sample No. | % soln uptake | % poly uptake | Wt soln | Wt poly |
| 1 | 146.2 | 37.9 | 14.58 | 3.78 | 20.6 | 1 | 115.8 | 25.1 | 14.36 | 3.11 |
| 2 | 138.8 | 38.0 | 14.69 | 4.02 | 21.5 | 2 | 118.2 | 25.6 | 14.24 | 3.09 |
| 3 | 151.0 | 38.9 | 14.92 | 3.84 | 20.5 | 3 | 121.6 | 26.4 | 14.49 | 3.14 |
| 4 | 147.0 | 41.7 | 14.67 | 4.16 | 22.1 | 4 | 113.9 | 24.7 | 14.21 | 3.08 |
| 5 | 152.1 | 38.3 | 15.00 | 3.78 | 20.1 | 5 | 114.5 | 24.8 | 14.28 | 3.10 |
| 6 | 140.4 | 41.2 | 14.59 | 4.28 | 22.7 | 6 | 112.3 | 24.3 | 14.09 | 3.05 |
| 7 | 165.3 | 48.3 | 15.44 | 4.51 | 22.6 | 7 | 122.3 | 26.5 | 14.60 | 3.16 |
| 8 | 147.9 | 41.6 | 14.89 | 4.19 | 22.0 | 8 | 111.4 | 24.1 | 14.30 | 3.10 |
| 9 | 143.9 | 40.4 | 14.95 | 4.20 | 21.9 | 9 | 130.9 | 28.4 | 14.93 | 3.24 |
| 10 | 148.9 | 44.0 | 14.71 | 4.35 | 22.8 | 10 | 127.7 | 27.7 | 14.95 | 3.24 |
| | 148.2 | 41.0 | 14.84 | 4.11 | 21.7 | | 118.8 | 25.8 | 14.45 | 3.13 |

Note:
Weight is in grams, soln is solution (while still liquid) poly is polymer (after curing) and percent solids is the solution converted to polymer.

TABLE 3

Relationship between maximum values (94% FA solution) and diluted (31% and 39% solution) values of wood properties.

| | Percent of maximum (94% FA) | | | | | |
|---|---|---|---|---|---|---|
| | Pine | | | Beech | | |
| % soln | Swell | Polymer | ASE | Swell | Polymer | ASE |
| 31 | 70 | NA | 61 | 61 | NA | 50 |
| 39 | 68 | 54 | 75 | 63 | 45 | 60 |

These results show that for about 30% of the amount of polymer in wood that a full load would give results in material that has 60% of the resistance to swelling for a lower density wood (pine) and about 50% for a higher density wood (beech). Therefore the polymer present in the wood is more effective in preventing swelling than its amount would first suggest.

Decay Resistance

The main reason for treating wood with this technology is to make it resistant to biodeterioration, especially decay caused by wood-rotting fungi. To test decay resistance, samples 50 mm long and 15 mm by 25 mm in cross section were treated with a solution concentration of 23.1% FA, and 5.1% each of MA and borax. They were then exposed to various brown and white rot fungi according to European Standard EN113. Test results are given in Table 4.

TABLE 4

| | Decay test results | | | |
|---|---|---|---|---|
| Fungus | Coniofora puteana | Poria placenta | Gleophyllum trabeum | Trametes versicolor |
| | Pine samples | | | |
| % wt loss | 1.5 | 2.0 | 4.2 | 0.3 |
| | 5.7 | −3.7 | 5.7 | −1.4 |
| | 5.3 | 2.4 | 1.2 | 1.6 |
| | 6.6 | −5.0 | 0.6 | −1.3 |
| | 0.1 | 2.0 | −2.0 | 0.9 |
| | 0.8 | −3.1 | −3.8 | 1.7 |
| | 1.3 | 2.2 | 0.9 | −5.1 |
| | 0.8 | −5.8 | 0.8 | 1.2 |
| Average | 2.8 | −1.1 | 1.0 | −0.3 |
| Overall average | | | | 0.6 |
| | Beech samples | | | |
| % wt loss | 0.5 | 6.0 | 0.9 | 7.5 |
| | 2.4 | 3.1 | 4.8 | 3.7 |
| | −2.1 | 3.8 | 5.9 | 3.5 |
| | 2.3 | 5.1 | 3.4 | 1.7 |
| | 1.0 | −1.6 | −2.9 | 0.1 |
| | 1.7 | 0.5 | −1.3 | 0.3 |

TABLE 4-continued

| | Decay test results | | | |
|---|---|---|---|---|
| Fungus | Coniofora puteana | Poria placenta | Gleophyllum trabeum | Trametes versicolor |
| | 2.5 | 0.2 | 0.4 | 1.1 |
| | 5.8 | 2.9 | −1.3 | −1.8 |
| Average | 1.8 | 2.5 | 1.2 | 2.0 |
| Overall average | | | | 1.9 |

The weight loss values for each fungus and both species allows the treated wood to be classed as <<highly resistant>> to decay according to Standard EN 113.

The solution of about 30% concentration was found to provide moisture and decay protection to the wood, However, other concentrations will also provide improved properties. To protect the ranges expected to be useful, the following water solution percentage limits are suggested:

| FA | | MA | | Borax | | NaOH | Up- |
|---|---|---|---|---|---|---|---|
| Lower | Upper | Lower | Upper | Lower | Upper | Lower | per |
| 2 | 90 | 2 | 5 | 1 | 5 | 1 | 5 |

The invention claimed is:

1. A method for preparing furan polymer impregnated wood, comprising impregnating wood in one impregnation step with a polymerizable furfuryl alcohol monomer solution, said solution containing, based on the weight of the solution, from 4.8 to 33.3% of furfuryl alcohol, from 1.9 to 5.1% of borax, from 1.9 to 5.1% of maleic anhydride or maleic acid or a combination thereof as a polymerization initiator for the polymerization of the furfuryl alcohol, and the balance water and curing the impregnated wood at a temperature in a range of from about 70 to about 140° C. to form furan polymer impregnated wood having a furan polymer content of from 6.3 to 48.3% based on the weight of the wood.

2. The method of claim 1, wherein said curing is performed at a temperature at the beginning of curing of about 70° C. and at the end of about 80° C., with a final drying between 100 to 120° C.

3. The method of claim 2, wherein said curing and drying can be performed from about 80 to 120° C.

4. The method of claim 3, wherein said curing is performed by submerging the impregnated wood in hot oil at 80 to 120° C., with the temperature either fixed or starting lower in the range and increasing as curing and drying proceeds.

* * * * *